US012352189B2

(12) United States Patent
Krach et al.

(10) Patent No.: US 12,352,189 B2
(45) Date of Patent: Jul. 8, 2025

(54) METHOD AND SYSTEM FOR POSITIVE CRANKCASE VENTILATION (PCV) DIAGNOSTICS

(71) Applicant: Ford Global Technologies, LLC, Dearborn, MI (US)

(72) Inventors: Adam Krach, Canton, MI (US); Michael Casedy, Ann Arbor, MI (US); Jose Francisco Martinez Leyva, Mexico City (MX); Katherine Jane Brewer, Belleville, MI (US); Erzabeth Holcombe, Northville, MI (US); Hussein Saab, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/528,152

(22) Filed: Dec. 4, 2023

(65) Prior Publication Data

US 2025/0179950 A1 Jun. 5, 2025

(51) Int. Cl.
*F01M 13/00* (2006.01)
*F01M 13/02* (2006.01)
*G07C 3/08* (2006.01)

(52) U.S. Cl.
CPC ............ *F01M 13/028* (2013.01); *G07C 3/08* (2013.01)

(58) Field of Classification Search
CPC .. F01M 13/00; F01M 2013/0083; F01M 1/18; F01M 11/10; F01M 2250/00; F01M 13/0011; F01M 13/028; F02D 41/22; F02D 2250/08
See application file for complete search history.

(56) References Cited

U.S. PATENT DOCUMENTS

| | | | | |
|---|---|---|---|---|
| 5,471,400 | A | 11/1995 | Smalley et al. | |
| 5,792,949 | A | 8/1998 | Hewelt et al. | |
| 10,012,166 | B1 | 7/2018 | Dudar | |
| 10,767,590 | B1 * | 9/2020 | Jentz | G07C 5/0816 |
| 10,871,129 | B1 | 12/2020 | Jentz et al. | |
| 10,876,447 | B1 | 12/2020 | Henson et al. | |
| 11,220,939 | B1 | 1/2022 | Jentz et al. | |
| 2004/0200271 | A1 * | 10/2004 | van Nieuwstadt | F01N 3/035 73/114.78 |
| 2021/0348532 | A1 * | 11/2021 | Holzeder | F01M 11/10 |
| 2023/0096261 | A1 * | 3/2023 | Kim | F01P 11/14 123/155 |

* cited by examiner

*Primary Examiner* — George C Jin
*Assistant Examiner* — Teuta B Holbrook
(74) *Attorney, Agent, or Firm* — Vincent Mastrogiacomo; McCoy Russell LLP

(57) ABSTRACT

Methods and systems are provided for implementing a diagnostic technique for a positive crankcase ventilation (PCV) assembly. In one example, the method includes generating an estimated crankcase pressure at the location of a crankcase pressure sensor based on a nominal model and a faulted model of a PCV system that is generated by a controller. The method further includes diagnosing a PCV system component based on a difference between the estimated crankcase pressure and an input from the crankcase pressure sensor; and responsive to the crankcase pressure sensor having a faulted diagnosis, triggering a sensor degradation indicator.

20 Claims, 11 Drawing Sheets

METHOD AND SYSTEM FOR POSITIVE CRANKCASE VENTILATION (PCV) DIAGNOSTICS

FIELD

The present description relates generally to methods and systems for diagnosing breach in crankcase ventilation in an engine system.

BACKGROUND/SUMMARY

Engines may include crankcase ventilation systems to vent gases from the crankcase into an engine intake manifold to provide evacuation of gases from inside the crankcase in order to reduce degradation of various engine components in the crankcase. Blow-by gas generated in the crankcase, which includes a mixture of air, combustion gas, and unburned fuel, is cleaned at an oil separator and introduced to an engine air intake passage, downstream of an air filter, via a crankcase ventilation tube (CVT). The crankcase gases introduced via the CVT are then combusted in the engine cylinders. If the CVT becomes disconnected or otherwise degraded while the engine is running, the blow-by gas is released, increasing emissions.

Crankcase ventilation systems may be intermittently diagnosed, in some vehicles. One example PCV diagnostic technique is shown by Jentz et al. in U.S. Pat. No. 10,767,590 B1. Therein, a sensed pressure in the PCV system is compared to a modeled pressure to ascertain system degradation.

However, the inventors herein have recognized potential issues with such an approach. For example, the approach described by Jentz may be less adaptable to changes in hardware than desired. Further, the diagnostic confidence of Jentz's diagnostic logic which models the PCV system using polynomial equations may be less than desired, in some cases.

To overcome at least a portion of the aforementioned issues the inventors developed a method for diagnosing a PCV system. In one example, the method includes, at a controller, generating an estimated crankcase pressure at the location of a crankcase pressure sensor based on a nominal model and a faulted model of a positive crankcase ventilation (PCV) system that is generated by the controller. The method further includes diagnosing a PCV system component based on a difference between the estimated crankcase pressure and an input from the crankcase pressure sensor. The method even further includes, responsive to the crankcase pressure sensor having a degraded diagnosis, triggering a sensor degradation indicator. In this way, a more confident PCV system diagnosis may be carried out jointly using a faulted model and a nominal model. As a result, the chance of PCV system misdiagnosis is decreased and PCV system performance may be consequently enhanced.

Further, in one example, diagnosing the PCV system component may include comparing the faulted model of the PCV system with the nominal model of the PCV system. Still further in such an example, the method may additionally include initiating monitoring of the crankcase pressure sensor when a difference between the faulted model and the nominal model surpasses a threshold value. In this way, the pressure sensor is selectively sampled to converse processing resources, thereby increasing diagnostic processing efficiency Additionally, in one example, the PCV system is modeled based on one or more pressure balanced equations which may be physics based. Using pressure balanced equations for the system modeling allows the diagnostic confidence to be even further increased which resultantly increases customer appeal.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
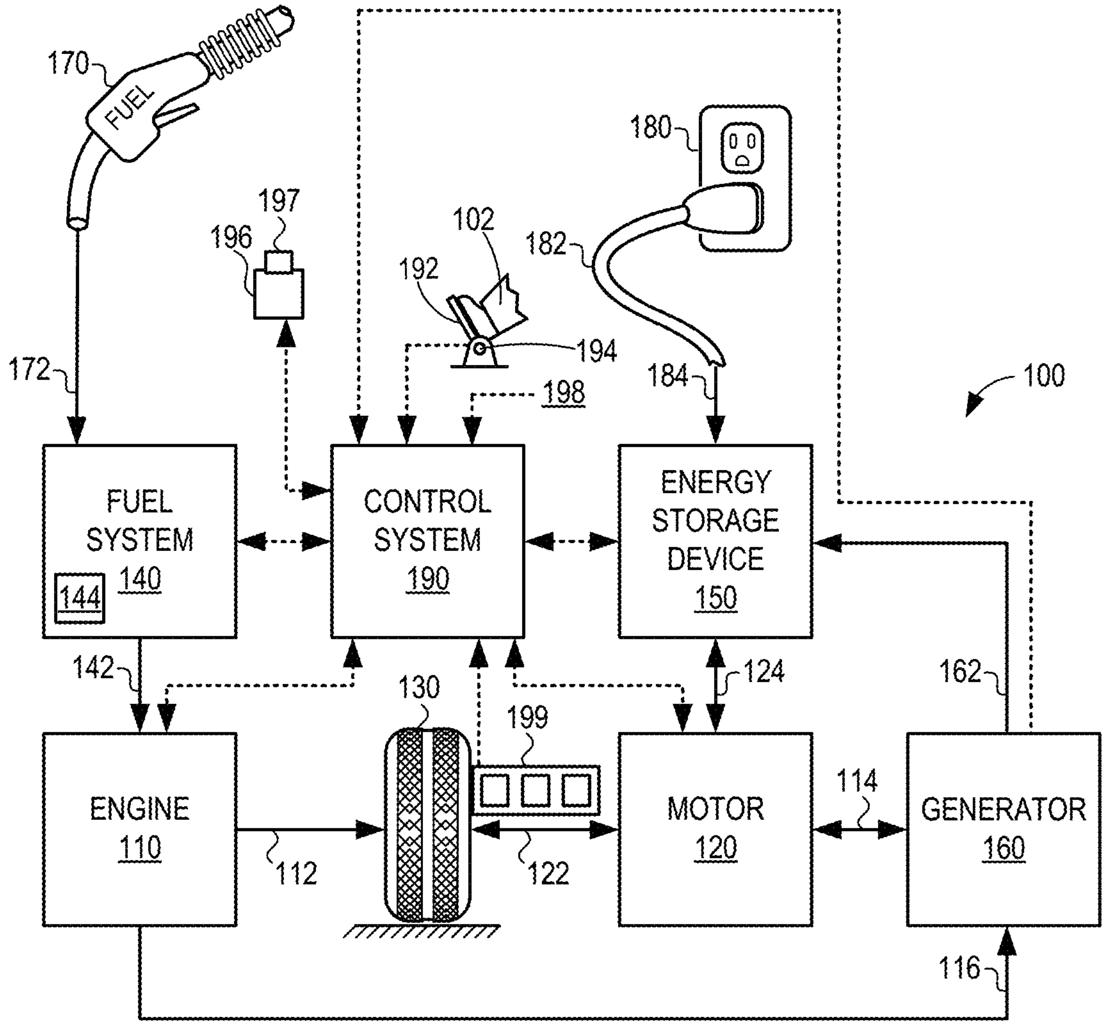
FIG. 1 shows an example hybrid electric vehicle propulsion system.

The following description relates to systems and methods for monitoring crankcase ventilation system integrity in an engine crankcase ventilation system. FIG. 1 illustrates an example vehicle propulsion system 100. The vehicle propulsion system 100 includes a fuel burning engine 110 and a motor 120. As a non-limiting example, the engine 110 includes an internal combustion engine and the motor 120 comprises an electric motor. Motor 120 may be configured to utilize or consume a different energy source than engine 110. For example, engine 110 may consume a liquid fuel (e.g., gasoline) to produce an engine output while motor 120 may consume electrical energy to produce a motor output. As such, a vehicle with propulsion system 100 may be referred to as a hybrid electric vehicle (HEV).

Vehicle propulsion system 100 may utilize a variety of different operational modes depending on operating conditions encountered by the vehicle propulsion system. Some of these modes may enable the engine 110 to be maintained in an off state (e.g., set to a deactivated state) where combustion of fuel at the engine is discontinued. For example, under select operating conditions, the motor 120 may propel the vehicle via the drive wheel 130 as indicated by arrow 122 while engine 110 is deactivated.

During other operating conditions, the engine 110 may be set to a deactivated state (as described above) while the motor 120 may be operated to charge the energy storage device 150. For example, the motor 120 may receive wheel torque from drive wheel 130 as indicated by arrow 122 where the motor may convert the kinetic energy of the vehicle to electrical energy for storage at the energy storage device 150 as indicated by arrow 124. This operation may be referred to as regenerative slowing of the vehicle. Thus, the motor 120 can provide a generator function in some embodiments. However, in other embodiments, a generator 160 may instead receive wheel torque from the drive wheel 130, where the generator may convert the kinetic energy of the vehicle to electrical energy for storage at the energy storage device 150 as indicated by arrow 162.

During still other operating conditions, the engine 110 may be operated by combusting fuel received from a fuel system 140 as indicated by arrow 142. For example, the engine 110 may be operated to propel the vehicle via drive wheel 130 as indicated by arrow 112 while the motor 120 is deactivated. During other operating conditions, both the engine 110 and the motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some embodiments, the motor 120 may propel the vehicle via a first set of drive wheels and the engine 110 may propel the vehicle via a second set of drive wheels.

In other embodiments, vehicle propulsion system 100 may be configured as a series type vehicle propulsion system, whereby the engine does not directly propel the drive wheels. Rather, the engine 110 may be operated to power the motor 120, which may in turn propel the vehicle via drive wheel 130 as indicated by arrow 122. For example, during select operating conditions, the engine 110 may drive the generator 160 as indicated by arrow 116, which may in turn supply electrical energy to one or more of the motor 120 as indicated by arrow 114 or energy storage device 150 as indicated by arrow 162. As another example, the engine 110 may be operated to drive the motor 120 which may in turn provide a generator function to convert the engine output to electrical energy, where the electrical energy may be stored at energy storage device 150 for later use by the motor.

The fuel system 140 may include one or more fuel storage tanks 144 for storing fuel on-board the vehicle. For example, fuel tank 144 may store one or more liquid fuels, including but not limited to: gasoline, diesel, and alcohol fuels. In some examples, the fuel may be stored on-board the vehicle as a blend of two or more different fuels. For example, fuel tank 144 may be configured to store a blend of gasoline and ethanol (e.g., E10, E85, etc.) or a blend of gasoline and methanol (e.g., M10, M85, etc.), whereby these fuels or fuel blends may be delivered to the engine 110 as indicated by arrow 142. Still other suitable fuels or fuel blends may be supplied to the engine 110, where they may be combusted at the engine to produce an engine output. The engine output may be utilized to propel the vehicle as indicated by arrow 112 or to recharge the energy storage device 150 via the motor 120 and/or the generator 160. The engine 110 and the other engines described herein may be configured for compression and/or spark ignition.

In some embodiments, the energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, the energy storage device 150 may include one or more batteries and/or capacitors.

Control system 190 may communicate with one or more of the engine 110, the motor 120, the fuel system 140, the energy storage device 150, and the generator 160. Control system 190 may receive sensory feedback information from one or more of the engine 110, the motor 120, the fuel system 140, the energy storage device 150, and the generator 160. Further, control system 190 may send control signals to one or more of the engine 110, the motor 120, the fuel system 140, the energy storage device 150, and the generator 160 responsive to this sensory feedback. The control system 190 may receive an indication of an operator requested output of the vehicle propulsion system from a vehicle operator 102. For example, the control system 190 may receive sensory feedback from a pedal position sensor 194 which communicates with a pedal 192. The pedal 192 may refer schematically to a foot caliper pedal and/or a speed adjustment pedal.

The energy storage device 150 may periodically receive electrical energy from a power source 180 residing external to the vehicle (e.g., not part of the vehicle) as indicated by arrow 184. As a non-limiting example, vehicle propulsion system 100 may be configured as a plug-in hybrid electric vehicle (HEV), whereby electrical energy may be supplied to energy storage device 150 from the power source 180 via an electrical energy transmission cable 182. During a recharging operation of the energy storage device 150 from the power source 180, the electrical transmission cable 182 may electrically couple the energy storage device 150 and the power source 180. While the vehicle propulsion system 100 is operated to propel the vehicle, electrical transmission cable 182 may be disconnected between the power source 180 and the energy storage device 150. The control system 190 may identify and/or control the amount of electrical energy stored at the energy storage device, which may be referred to as the state of charge (SOC).

In other embodiments, the electrical transmission cable 182 may be omitted, where electrical energy may be received wirelessly at the energy storage device 150 from the power source 180. For example, the energy storage device 150 may receive electrical energy from the power source 180 via one or more of electromagnetic induction, radio waves, and electromagnetic resonance. As such, it should be appreciated that any suitable approach may be used for recharging energy storage device 150 from a power source that does not comprise part of the vehicle, such as from solar or wind energy. In this way, the motor 120 may propel the vehicle by utilizing an energy source other than the fuel utilized by the engine 110.

The fuel system 140 may periodically receive fuel from a fuel source residing external to the vehicle. As a non-limiting example, the vehicle propulsion system 100 may be refueled by receiving fuel via a fuel dispensing device 170 as indicated by arrow 172. In some embodiments, fuel tank 144 may be configured to store the fuel received from the fuel dispensing device 170 until it is supplied to the engine 110 for combustion. In some embodiments, control system 190 may receive an indication of the level of fuel stored at the fuel tank 144 via a fuel level sensor. The level of fuel stored at the fuel tank 144 (e.g., as identified by the fuel level sensor) may be communicated to the vehicle operator 102, for example, via a fuel gauge or indication in a vehicle instrument panel 196.

The vehicle propulsion system 100 may also include an ambient temperature/humidity sensor 198, and a roll stability control sensor, such as a lateral and/or longitudinal and/or yaw rate sensor(s) 199. The vehicle instrument panel 196 may include indicator light(s) and/or a text-based display in which messages are displayed to an operator. The vehicle instrument panel 196 may also include various input portions for receiving an operator input, such as buttons, touch screens, voice input/recognition, etc. For example, the vehicle instrument panel 196 may include a refueling button 197 which may be manually actuated or pressed by a vehicle operator to initiate refueling.

In an alternative embodiment, the vehicle instrument panel 196 may communicate audio messages to the operator without display. Further, the sensor(s) 199 may include a sensor to indicate road roughness. These devices may be connected to the control system 190. In one example, the control system may adjust engine output and/or the wheel calipers to increase vehicle stability in response to the sensor(s) 199.

Figure 2:
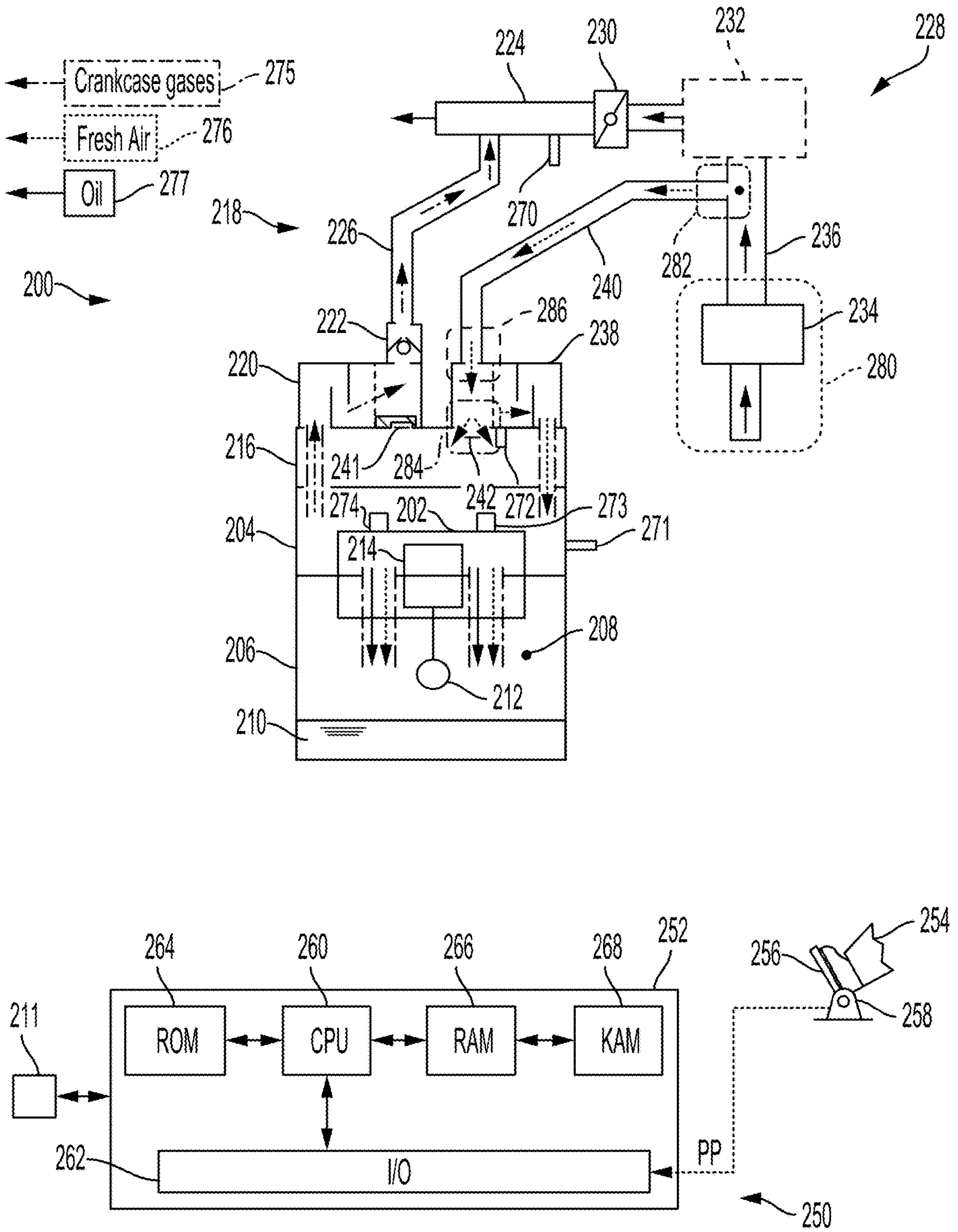
FIGS. 2 and 3 show a depiction of an engine with a positive crankcase ventilation (PCV) system which operates under a lower load and a higher load condition, respectively.

Referring now to FIG. 2, it shows an example system configuration of an internal combustion engine 200 which may be included in a propulsion system of an automotive vehicle. In one example, engine 200 may be an example of engine 110 of FIG. 1 in the vehicle system 100 of FIG. 1.

The internal combustion engine 200 may include least one cylinder 202 formed therein via a cylinder head 204 and a cylinder block 206. The cylinder block 206 may include a crankcase 208 that includes an oil reservoir 210 (e.g., oil sump) with oil therein and a crankshaft 212 which is coupled to a piston 214. A cam cover 216 may be coupled to the cylinder head 204.

A PCV system 218 may further be included in the internal combustion engine 200 and/or vehicle more generally. The PCV system 218 may include an oil separator 220 (e.g., a partial load (pull) oil separator) incorporated in or coupled to the cam cover 216. The oil separator 220 is in fluidic communication with the crankcase 208 and is configured to remove oil (e.g., oil droplets) from the gasses flowing therethrough and may return the oil to the oil reservoir 210. The PCV system 218 further includes a PCV flow valve 222 which is in fluidic communication with an intake manifold 224 via a PCV conduit 226 (e.g., a PCV tube). The PCV flow valve 222 controls the flowrate of gasses therethrough. The gas flowrate adjustment may be dependent on the intake manifold vacuum.

The intake manifold 224 is included in an intake system 228 which provides gas to the cylinder 202. A throttle 230 may further be included in the intake system 228 which controls the gas flow to the cylinder 202. A compressor 232 (which may be included in a turbocharger or a supercharger) may be included in the intake system 228. However, in other examples, the engine may be configured as a naturally aspirated engine. The intake system 228 may further include an air filter 234 in an intake conduit 236 upstream of the throttle 230 and compressor 232 in the case of a boosted engine.

The PCV system 218 further includes another oil separator 238 (e.g., higher load (push) oil separator) coupled to or incorporated into the cam cover 216. The oil separator 238 is in fluidic communication with the crankcase 208 as well as the intake conduit 236 via a PCV conduit 240.

The PCV system 218 may further include valves 241, 242 (e.g., check valves) in the cam cover 216 that allow gas flow to be diverted around the oil separators 220, 238 when gas or air is flowing back into the crankcase from the intake system. In this way, losses in the PCV system may be decreased.

Engine 200 may be controlled at least partially by a control system 250 including a controller 252 and by input from a vehicle operator 254 via an input device 256. In this example, input device 256 includes a speed adjustment pedal and/or a caliper pedal and a pedal position sensor 258 for generating a proportional pedal position signal PP.

Controller 252 is shown in FIG. 2 as a microcomputer, including microprocessor unit 260, input/output ports 262, an electronic storage medium for executable programs and calibration values shown as read-only memory chip 264 in this particular example, random access memory 266, keep alive memory 268, and a data bus.

Controller 252 may receive various signals from sensors coupled to engine 200, including measurement of manifold airflow pressure (MAP) sensor 270; engine coolant temperature (ECT) from temperature sensor 271 exhaust gas air/fuel ratio from exhaust gas sensor; a crankcase pressure sensor (CKCP) 272; BP sensor, TIP sensor, etc. Furthermore, controller 252 may monitor and adjust the position of various actuators based on input received from the various sensors. These actuators may include, for example, throttle 230, and intake and exhaust valve systems 273, 274. Storage medium read-only memory 264 can be programmed with computer readable data representing instructions executable by processor 260 for performing the methods described below, as well as other variants that are anticipated but not specifically listed. Example diagnostic methods and routines are described herein with reference to FIGS. 4-13.

An indicator 211 (e.g., haptic, audio, and/or visual indicator) may be electronically coupled to the controller 252 which may inform the operator of a degraded condition of a component in the PCV system 218. For instance, the indicator may be located in a vehicle cabin.

FIG. 2 illustrates the general flow pattern in the PCV system 218 during a lower load (e.g., partial load)/non-boosted operating condition. Arrows 275 specifically denote the general flow direction of crankcase gasses, arrows 276 denote the flow of fresh air, and arrows 277 denote the flow of oil (e.g., oil droplets) in the system. As shown, crankcase gasses flow from the crankcase to the cam cover and through the oil separator 220, into the PCV conduit 226, and then into the intake manifold 224. Conversely, fresh air flows from the intake conduit 236 to the oil separator 238 via the PCV conduit 240. From the oil separator 238, fresh air flows into the crankcase 208. Further, as shown, oil flows from the cylinder head 204 to the cylinder block 206 and then to the oil reservoir 210 in the crankcase 208. Thus, oil may travel past the piston ring(s) in the engine.

A potential boundary of the air intake system (AIS) is denoted at 280. However, the AIS may have another suitable boundary in alternate embodiments. The location 282 of $p_{hose\ spigot}$ which is a pressure at an end of the PCV conduit 240 in the PCV system is indicated in FIG. 2. It will be understood, that during the partial load/non-boosted condition, fresh air is drawn into the PCV conduit 240 and the end of the conduit that opens into The location 284 of the CKCP Sensor 272 is further indicated in FIG. 2. The location 286 of $p_{outlet\ spigot}$ which is a pressure at another end of the PCV conduit 240 in the PCV system is indicated in FIG. 2.

Figure 3:
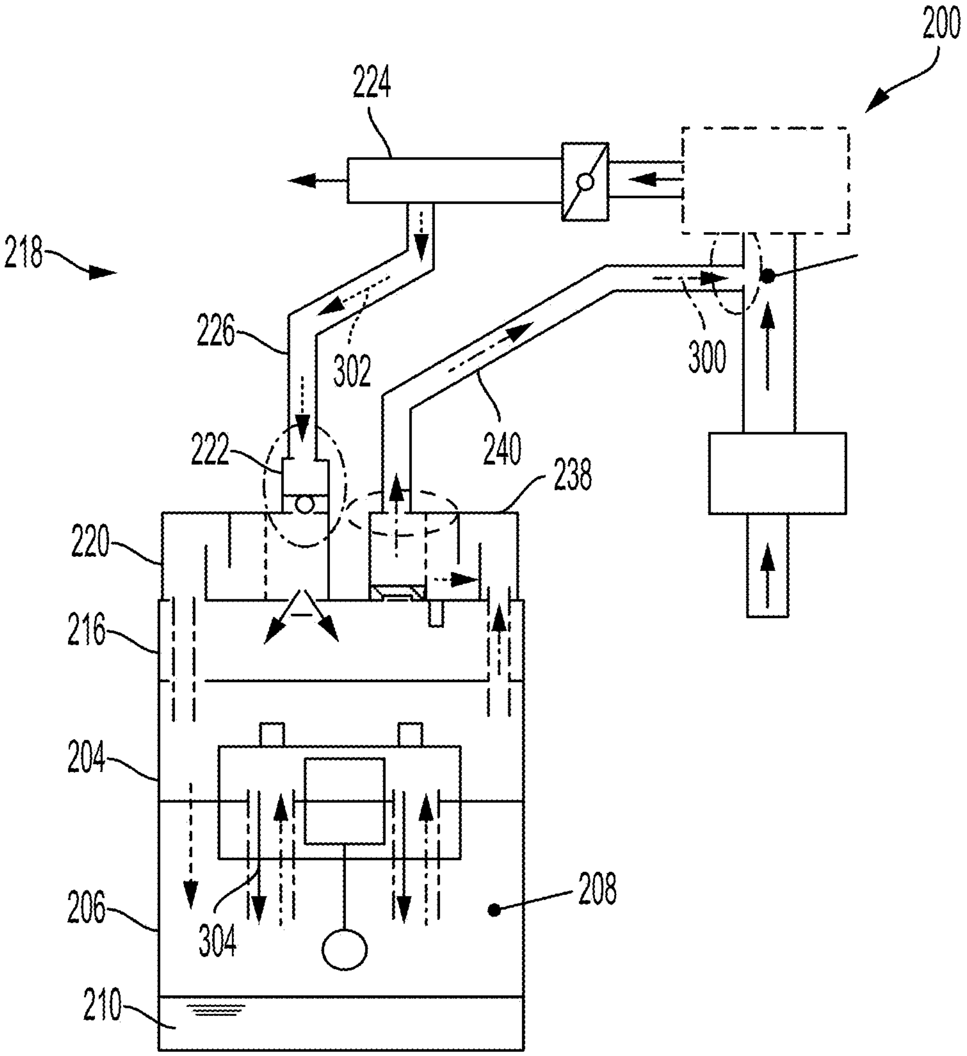

FIG. 3 shows the PCV system 218 operating under a higher load (e.g., full load)/boosted condition. Components in the PCV system 218 are similarly number with regard to the PCV system 218 depicted in FIG. 2 and redundant description is omitted for brevity.

Arrows 300 specifically denote the general flow direction of crankcase gasses, arrows 302 denote the flow of fresh air, and arrows 304 denote the flow of oil in the system.

As shown in FIG. 3, crankcase gasses flow from the crankcase 208 to the cam cover 216, through the oil separator 238, into the PCV conduit 240, and to the intake conduit 236. Conversely, fresh air flows from the intake manifold 224 to PCV flow valve 222 via the PCV conduit 226. However, as shown in FIG. 3, the PCV valve is closed and therefore, fresh air does not flow into the crankcase 208. Further, as shown, oil flows from the cylinder head 204 to the cylinder block 206 and then to the crankcase 208. Thus, oil travels past the piston ring(s) in the engine 200, for example, an into the crankcase 208 and then the oil reservoir 210. Conversely, crankcase gases flow past the piston rings and into the cam cover 216 and then the oil separator 238.

Figure 4:
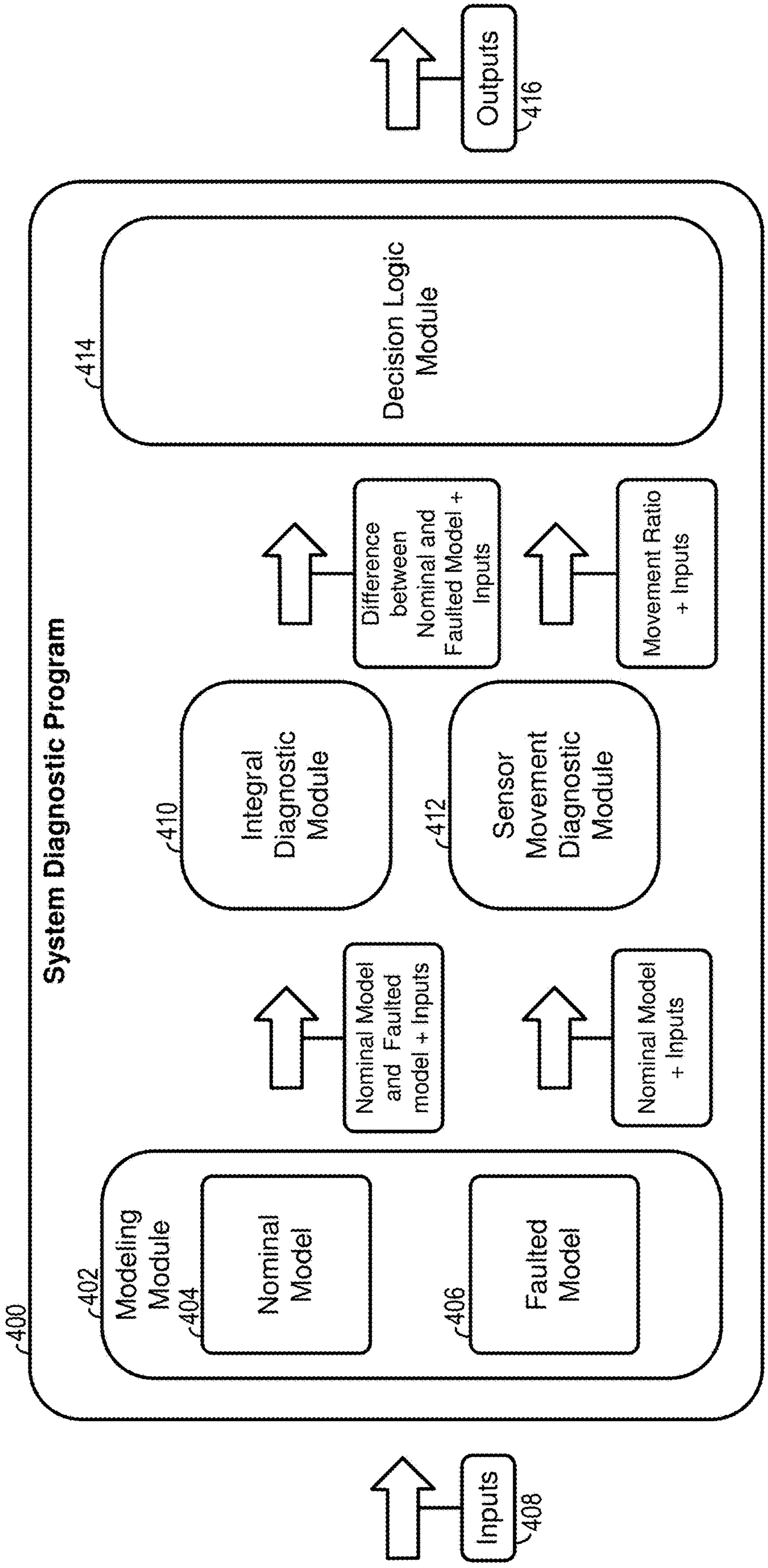
FIG. 4 shows a diagram of a diagnostic technique for a PCV system.

FIG. 4 shows a diagram of a process flow for a model based PCV system diagnostic program 400 that may be implemented in a controller, such as the controller 252 shown in FIG. 2 or another suitable controller. It will be appreciated that the diagnostics may be implemented in a single drive cycle.

As shown, the diagnostic program 400 includes different diagnostic modules which may receive data and output data to other modules and to vehicle components outside the controller. As shown, the diagnostic program 400 includes a modeling module 402 which is configured to execute a nominal model 404 and a faulted model 406.

The inputs 408 for the modeling module 402 may include estimated engine airflow, CKCP sensor fault status, crankcase pressure via the CKCP sensor, time since engine start, barometric pressure, estimated engine airflow, CKCP sensor fault status, an engine running condition (e.g., Key-On), engine speed, battery voltage, ambient air temperature, and/or engine speed. The inputs may be sensed and/or modeled. Example of logic that may be implemented in the modeling module is shown FIG. 5.

Figure 9:
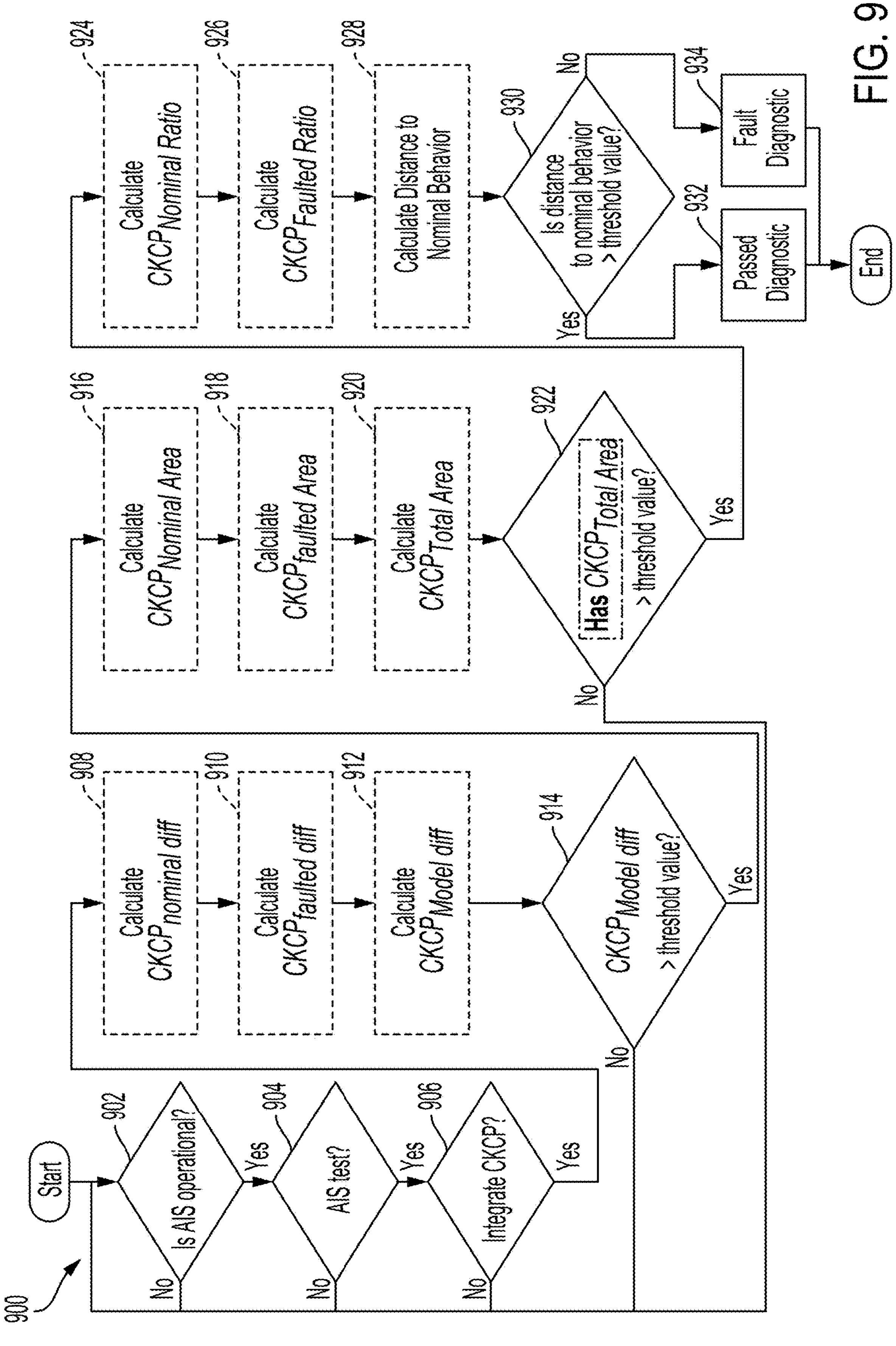
FIG. 9 shows an integral diagnostic method for a PCV system.
Figure 13:
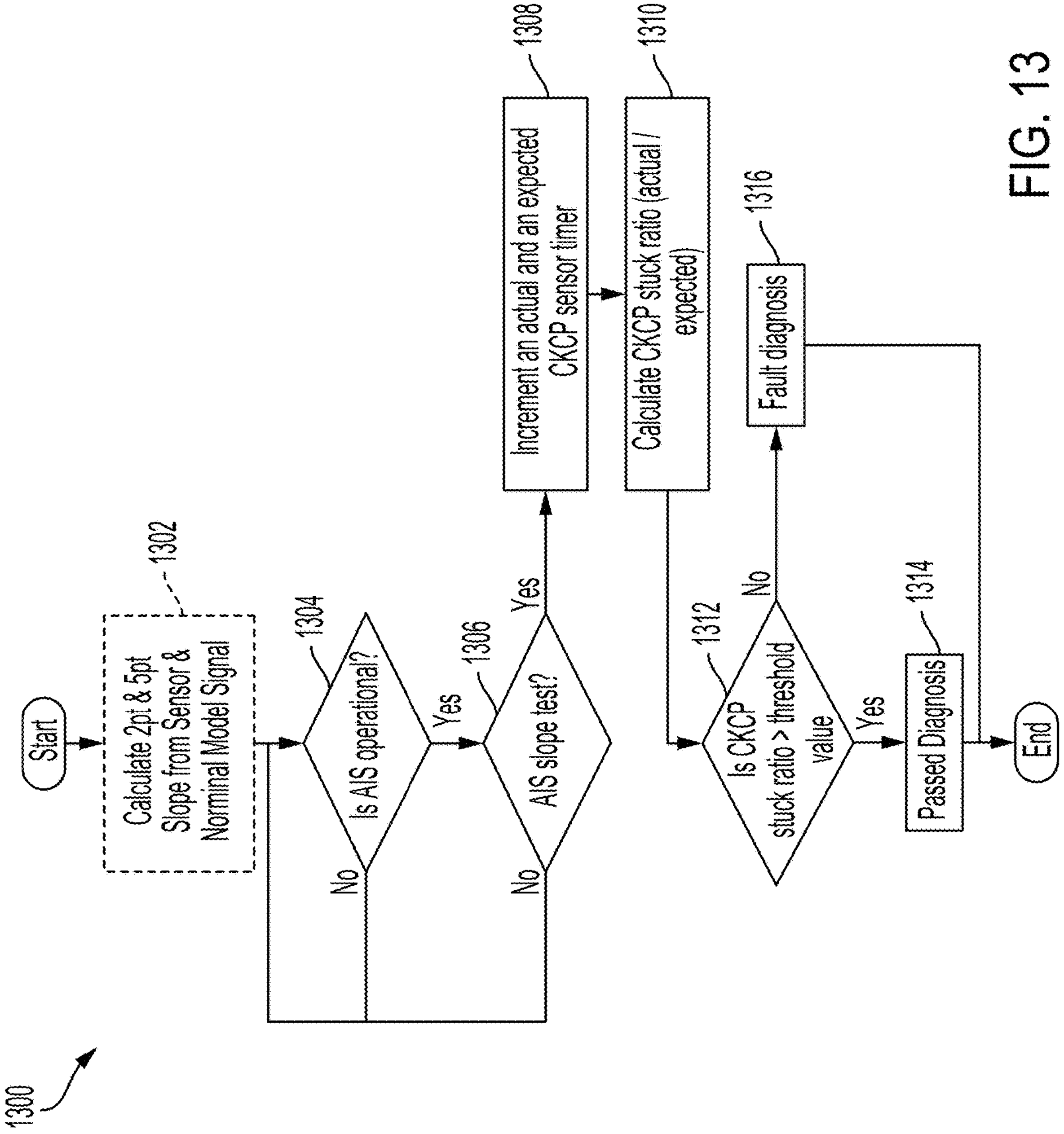
FIG. 13 shows a sensor movement diagnostic method for a PCV system.

Output from the modeling module 402 are transferred to an integral diagnostic module 410 and a sensor movement diagnostic module 412. To expound, the nominal model and the faulted model may be input into the integral diagnostic module 410. The nominal model may also be input into the sensor movement diagnostic module 412. Further, the inputs may be transferred from the modeling module 402 to the integral diagnostic module 410 and the sensor movement diagnostic module 412. Examples of logic that may be implemented in the integral diagnostic module 410 and the sensor movement diagnostic module 512 is shown in FIGS. 9 and 13, respectively.

The diagnostic program 400 further includes a decision logic module 414, in the illustrated example. The integral diagnostic module 410 sends the difference (e.g., the distance) between the nominal model and the faulted model and the inputs to the decision logic module 414. Further, the sensor movement diagnostic module 412 sends the movement ratio between the CKCP sensor and the nominal module to the decision logic module 414.

The decision logic module 414 outputs (at 416) a working or degraded indication for the CKCP sensor and/or other PCV system component such as a PCV conduit. This indication may trigger an indicator (e.g., haptic, audio, and/or visual) for the operator and/or trigger mitigating actions such as constraining engine speed.

The PCV system may be modeled for a condition where the engine is operating without boost, referred to as a pull side direction condition. To elaborate, during a non-boosted condition the system may exhibit the following characteristics: the intake manifold vacuum pulls crankcase gases (ring blow by +fresh air) through crankcase into the intake manifold; the PCV valve controls flow rate (dependent on Intake vacuum); the oil separator removes oil droplets from crankcase gases prior to re-ingestion into engine; and oil is removed from separator returned to sump.

Equations (1)-(2) may be used to determine equation (3). Equations (4) and (5) may be used to determine equation (6). Further, $C_1$ and $C_2$ may be considered constants. R denotes flowrate and p denotes pressure.

$$\dot{q}_{blowby}=f(MAP_{gage},RPM) \tag{1}$$

$$\dot{q}_{pcv}=f(MAP_{gage}) \tag{2}$$

$$\dot{q}_{oil\ sep\ pull}=\dot{q}_{pcv}-\dot{q}_{blowby} \tag{3}$$

$$p_{outlet\ spigot}=a*\dot{q}_{oil\ sep\ pull}{}^2+b*\dot{q}_{oil\ sep\ pull}+C \tag{4}$$

$$p_{hose\ spigot}=d*\dot{q}_{oil\ sep\ pull}{}^2+e*\dot{q}_{oil\ sep\ pull}+f \tag{5}$$

$$\mathrm{CKCP}_{nominal\ pull}=p_{fresh\ air}-(p_{outlet\ spigot}+p_{hose\ spigot}) \tag{6}$$

$$\mathrm{CKCP}_{AIS\ Fault\ pull}=-C_1*(p_{outlet\ spigot}+p_{hose\ spigot}) \tag{7}$$

$$\mathrm{CKCP}_{Cam\ Cover\ Fault\ pull}=-C_2(0+p_{outlet\ spigot}) \tag{8}$$

$\mathrm{CKCP}_{nominal}$ pull is the nominal crankcase pressure sensor pressure value modeled, during a pull condition. $\mathrm{CKCP}_{AIS}$ Fault pull is the faulted air intake system (AIS) crankcase pressure sensor pressure value modeled, during a pull condition. $\mathrm{CKCP}_{Cam\ Cover\ Fault\ pull}$ is the faulted cam cover crankcase pressure sensor pressure value modeled, during a pull condition. It will be understood that equations (4)-(8) are pressure balanced equations.

Further, in some examples, equations (6)-(8) may be used to determine equations (9) and (10) below, which may be used in the model. However, in other examples, equations (9) and (10) may not be used in the model.

$$Dp_{pull\ sep}=f(\dot{q}_{oil\ sep\ pull}) \tag{9}$$

$$\mathrm{Crankcase}_{nominal\ pull}=\mathrm{CKCP}_{nominal\ pull}-Dp_{pull\ sep} \tag{10}$$

The PCV system may be modeled for a condition where the engine is operating with boost, referred to as a push side direction condition. To elaborate, during a boosted condition the system may exhibit the following characteristics: no intake vacuum; fresh air side of system is to ventilate gases; full load does not flow through valve; and the PCV system connects to the compressor inlet.

Equations (11)-(12) may be used to determine equation (13). Equations (14) and (15) may be used to determine equation (16). Further, $C_1$ and $C_2$ may be considered constants. R denotes flowrate and p denotes pressure.

$$\dot{q}_{blowby}=f(MAP_{gage},RPM) \tag{11}$$

$$\dot{q}_{pcv}=f(MAP_{gage}) \tag{12}$$

$$\dot{q}_{oil\ sep\ pull}=\dot{q}_{pcv}-\dot{q}_{blowby} \tag{13}$$

$$p_{outlet\ spigot}=a*\dot{q}_{oil\ sep\ pull}{}^2+b*\dot{q}_{oil\ sep\ pull}+C \tag{14}$$

$$p_{hose\ spigot}=d*\dot{q}_{oil\ sep\ pull}{}^2+e*\dot{q}_{oil\ sep\ pull}+f \tag{15}$$

$$\mathrm{CKCP}_{nominal\ pull}=p_{fresh\ air}-(p_{outlet\ spigot}+p_{hose\ spigot}) \tag{16}$$

$$\mathrm{CKCP}_{AIS\ Fault\ pull}=-C_1*(p_{outlet\ spigot}+p_{hose\ spigot}) \tag{17}$$

$$\mathrm{CKCP}_{Cam\ Cover\ Fault\ pull}=-C_2(0+p_{outlet\ spigot}) \tag{18}$$

Further, in some examples. equations (16)-(18) may be used to determine equations (19) and (20) below, which may be used in the model. However, in other examples, equations (19) and (20) may not be used in the model.

$$Dp_{push\ sep}=f(\dot{q}_{oil\ sep\ push}) \tag{19}$$

$$\mathrm{Crankcase}_{nominal\ push}=\mathrm{CKCP}_{nominal\ push}-Dp_{push\ sep} \tag{20}$$

Figure 5:
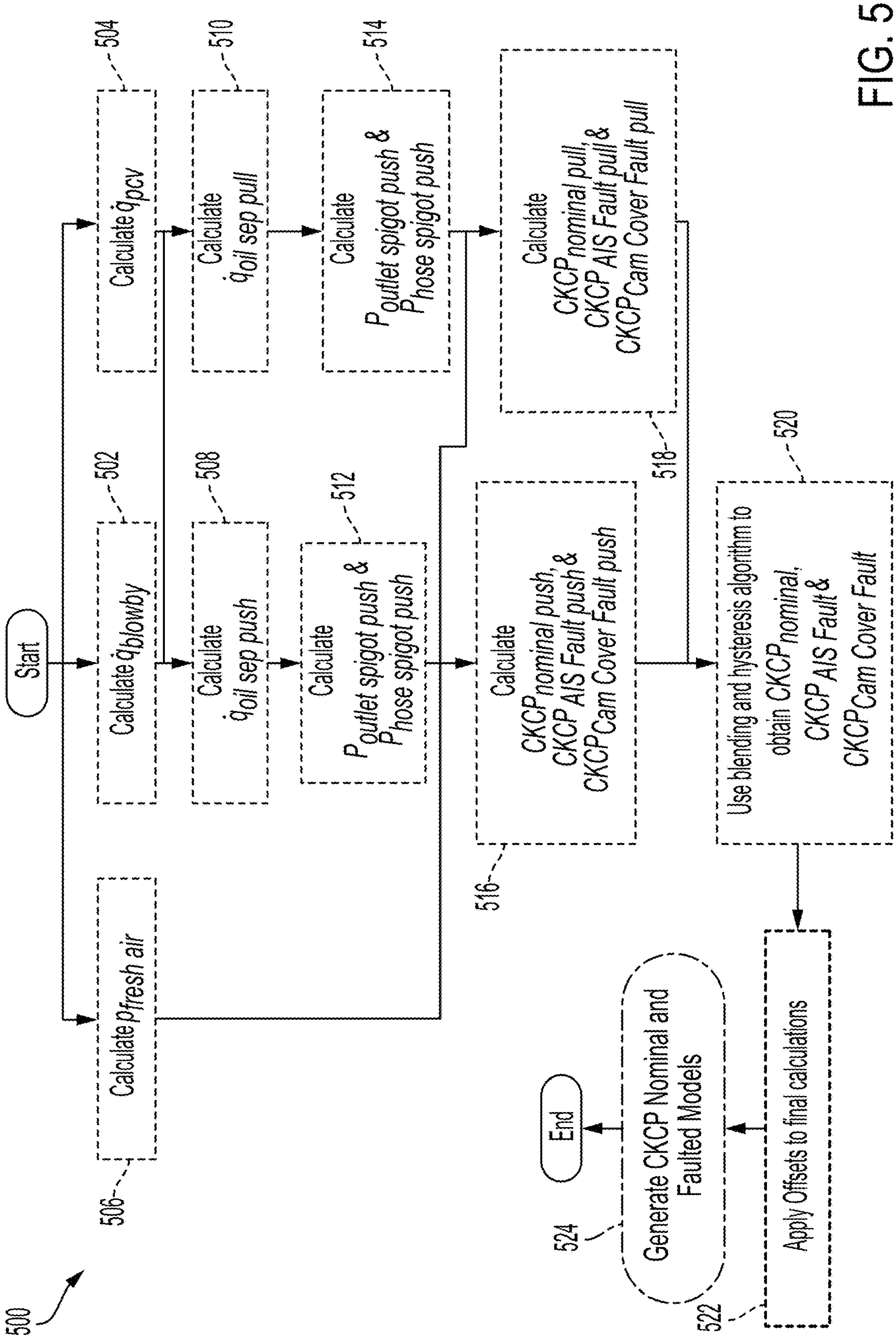
FIG. 5 shows a method for generating faulted and nominal models in a PCV system diagnostic process flow.

Turning now to FIG. 5, an example method 500 is shown for diagnosing a PCV system, such as the PCV system shown in FIGS. 2 and 3. Instructions for carrying out method 500 may be executed by a controller based on instructions stored on a memory of the controller and in conjunction with signals received from sensors of the engine system, such as the sensors described above with reference to FIGS. 2-3. The controller may employ actuators of the vehicle system to adjust vehicle operation, according to the methods described below. It will be appreciated that the calculations shown in method 500 may use equations (1)-(18), described above. Further, method 500 may be implemented in the modeling module 402, depicted in FIG. 4.

Figure 6:
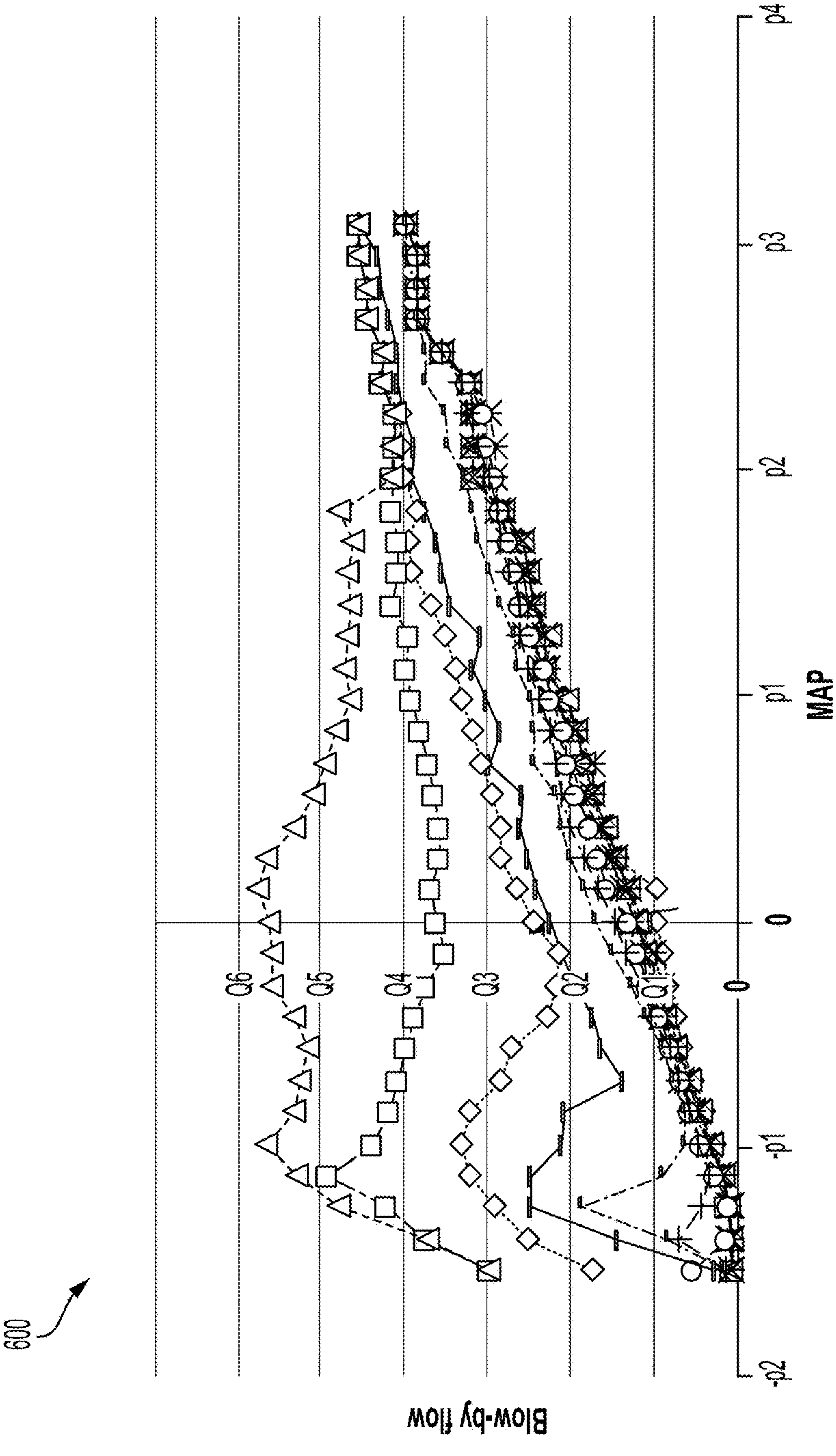
FIGS. 6-8 show different graphs related to the method depicted in FIG. 5.

At 502, the method includes calculating blow-by flowrate ($\dot{q}_{blowby}$). The blow-by flowrate is the flowrate of gas that travels past the piston ring(s) in the engine. In one example, calculating the blow-by flowrate may involve mapping the engine at different engine speeds and manifold air pressures (MAPs). To elaborate, the change in blow-by pressure may be modeled as a three-dimensional table which outputs the steady state value of blow-by at a given engine speed and gauge MAP, in one example. Further, in such an example, the rolling average may be determined with TC as a function of engine speed to the steady state result to obtain a transient value. Still further, certain lower and higher engine speed points may not be mapped. Therefore, interference of the probable values for blow-by flowrate may be reduced, in some cases. Even further, mapping the blow-by flowrate may not be an engine commodity or feature calibration task, in one specific example. FIG. 6 shows a graph 600 of PCV flowrate vs MAP which may be used to determine blow-by flowrate. Although specific flowrates and MAPs are not provided, MAP increases from left to right and flowrate increases from bottom to top in the frame of reference, depicted in FIG. 6.

Figure 7:
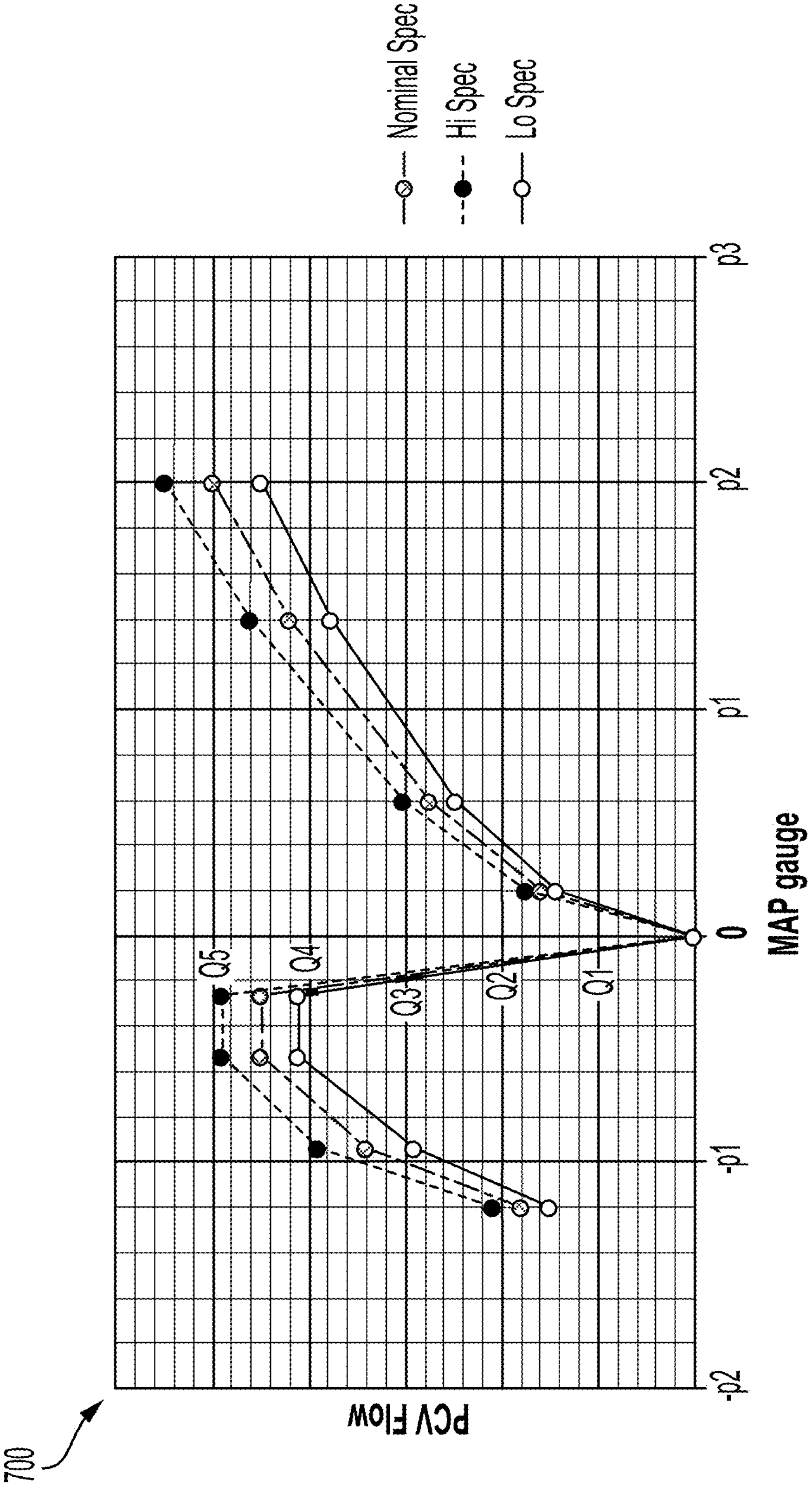

Continuing with FIG. 5, at 504, the method includes calculating PCV flowrate ($\dot{q}_{pcv}$). The PCV flowrate may be determined based on PCV valve specification which may be obtained from a manufacturer, for instance. A single direction valve should have 0 flow when boosted, in some examples. Bi-direction valves exhibit non-zero flow when boosted and non-boosted. The PCV flowrate may be assumed as a steady state value, in one example. In such an example, the rolling average may be added with the TC as a function of engine speed to obtain a useable transient value. Further, the boosted side may assume that AM (which is a function of caliper pressure (BP)) and differential pressure (Dp) may behave as a radical function (e.g., a square root function). FIG. 7 shows a graph 700 of PCV flowrate vs gauge MAP which may be used to determine PCV flowrate. Although specific flowrates and MAPs are not provided, MAP increases from left to right and flowrate increases from bottom to top in the frame of reference, depicted in FIG. 7.

Figure 8:
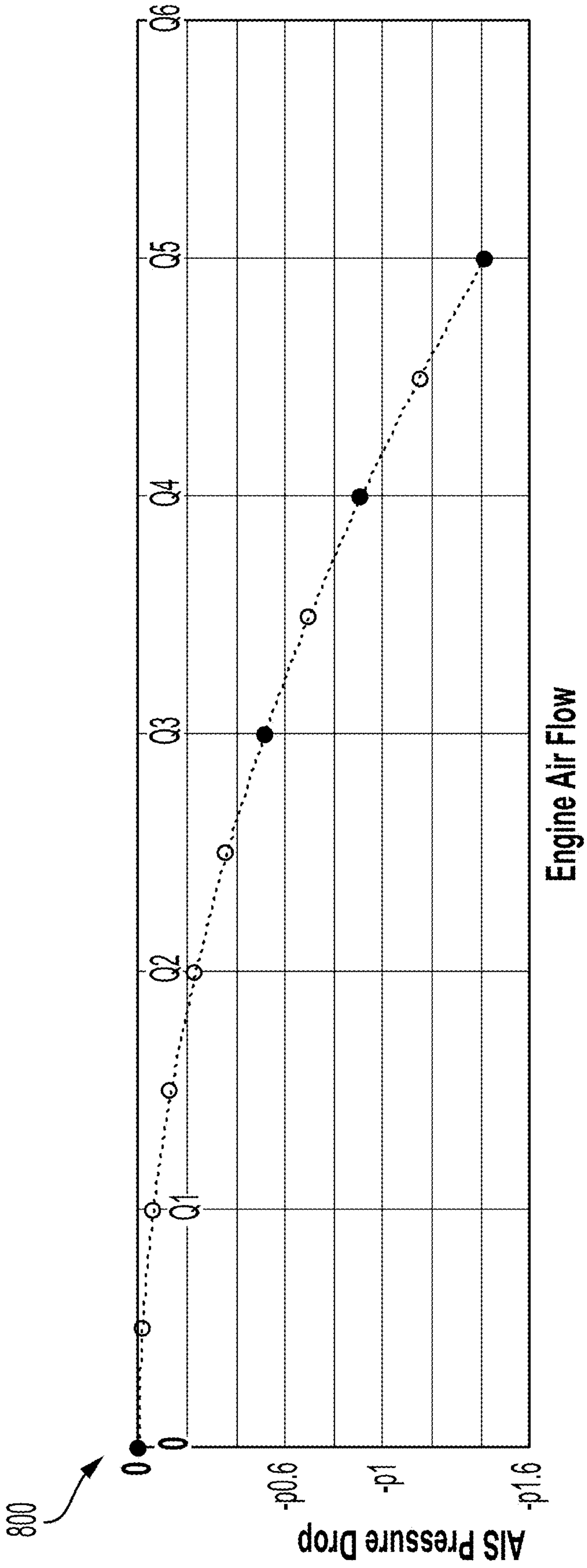

Continuing with FIG. 5, at 506, the method includes calculating the pressure of the fresh air ($p_{fresh\ air}$) in the air intake system (AIS). In one example, the pressure of the fresh air may be calculated as a function of the total engine airflow by fitting a quadratic function from several computer aided engineering (CAE) snapshots which may estimate the pressure drop of the AIS at different airflows. At least three points are desired for this quadratic function fit. Further, at a 0 mass flowrate, there should be a 0 pressure drop, in some cases. FIG. 8 shows a graph 800 of AIS pressure drop vs engine airflow which may be used to determine the fresh air pressure. Although specific pressure drops and engine airflows are not provided, engine airflow increases from left to right and pressure increases from bottom to top in the frame of reference, depicted in FIG. 8. The values on the graph 800 may be determined (e.g., estimated) by quadratic fit and/or CAE analysis.

At 508, the method includes, for a push condition in the PCV system, calculating the flowrate ($\dot{q}_{oil\ sep\ pull}$) at the push oil separator. Equation 3 may be used to determine this flowrate.

At 510, the method includes, for a push condition in the PCV system, calculating the pressure ($p_{outlet\ spigot}$) at the outlet of the PCV conduit (e.g., the PCV conduit 240 depicted in FIG. 2) and the pressure ($p_{hose\ spigot}$) at the inlet of the PCV conduit. The PCV conduit is fluidly connected to the crankcase via the cam cover and the intake system upstream of the throttle and compressor. Equations (14) and (15) may be used to calculate these pressures.

At 514, the method includes, for a pull condition in the PCV system, calculating the pressure ($p_{outlet\ spigot}$) at the outlet of the PCV conduit (e.g., the PCV conduit 240 depicted in FIG. 2) and the pressure ($p_{hose\ spigot}$) at the inlet of the PCV conduit. Equations (4) and (5) may be used to calculate these pressures.

In one example, the coefficients (a, b, c, d, e, and f) in equations (4), (5), (14), and (15) may be determined by flowing the hose and outlet spigot to fit a quadratic curve to oil separator flow and pressure drop. Mapping these coefficients may not be an engine commodity or feature calibration task. Further, these coefficients may be used to calculate the pressure drop as a function of oil separator flow, independent of whether the system is boosted (push direction) or non-boosted (pull direction).

At 516, the method includes, for a push condition, calculating a nominal pressure ($CKCP_{nominal\ push}$) for a push condition, an AIS fault pressure ($CKCP_{AIS\ Fault\ push}$) for a push condition, and a cam cover pressure ($CKCP_{Cam\ Cover\ Fault\ push}$) for a push condition. Equations (16)-(18) may be used to determine these pressures.

At 518, the method includes, for a pull condition, calculating a nominal pressure ($CKCP_{nominal\ pull}$) for a pull condition, an AIS fault pressure ($CKCP_{AIS\ Fault\ pull}$) for a pull condition, and a cam cover pressure ($CKCP_{Cam\ Cover\ Fault\ pull}$) for a pull condition. Equations (6)-(8) may be used to determine these pressures.

At 520, the method includes, using blending and hysteresis algorithms to determine a nominal pressure $CKCP_{nominal}$ for the crankcase pressure sensor, an AIS fault pressure $CKCP_{AIS\ Fault}$, and a faulted cam cover pressure ($CKCP_{Cam\ Cover\ Fault}$). Engine behavior (e.g., daily engine behavior) may have boosted and non-boosted operation in order to have a desirable CKCP pressure model. The model therefore may be able to blend the pull and push direction calculations, at shown in step 520 in FIG. 5. The blending of the push and pull direction calculations may be achieved by a weighted factor equation, a hysteresis algorithm, and/or multiple (e.g., two) rolling averages. A potential weighted factor equation is provided below.

$$CKCP_{final} = CKCP_{pull} * \text{Current Factor} + (1 - \text{Current Factor}) * CKCP_{push} \quad (21)$$

In the weighted factor equation (21), $CKCP_{pull}$ is the expected pull behavior for the (nominal or faulted) model; where $CKCP_{push}$ is the expected push behavior for the (nominal or faulted) model; and where current factor may be a blending factor that may be determined by the hysteresis algorithm and rolling average. The hysteresis algorithm may be written such that the system may determine a preliminary current factor (called pull factor) and what the time constant for the first rolling average is going to be. The hysteresis algorithm may be implemented: if the system is non-boosted and the gauge MAP goes above a given threshold (push threshold), pull factor=0, meaning the model is going to be 100% $CKCP_{push}$, if not the system may keep the pull factor=1. Conversely, the hysteresis algorithm may be implemented if the system is boosted and gauge map goes below a given threshold (pull threshold), pull factor=1, meaning the model is going to be 100% $CKCP_{pull}$, if not the system may keep the pull factor=0.

At 522, the method includes applying offsets to the calculations determined in step 520. To elaborate, in one example, ram air effect offset may be used in the nominal model calculation. Vehicle testing has suggested that the CKCP sensor saw an offset that was proportional to vehicle speed. This offset may be included in the model and is a function of vehicle speed and barometric pressure (BP) as vehicle data appears to suggest the offset may also change by altitude. Further, the calculation may be implemented in a program as a 3D table with vehicle speed and BP as inputs. Still further, an engine speed offset may be implemented, in some cases. Even further, in some examples, the ram air effect offset may be solely applied to nominal model calculations. Equation (22) may specifically be used to determine the modeled nominal pressure sensor pressure ($CKCP_{nominal\ final}$).

$$CKCP_{nominal\ final}=CKCP_{nominal}+VSPD_{offset} \quad (22)$$

A program may be used to setup a model that would allow the powertrain control module (PCM) data to be run through to refine and compare the model results to actual data. In one example, the model may be saved as a subsystem. Further, the outputs of the model may be the nominal and faulted model CKCP estimates: $CKCP_{nominal}$, $CKCP_{AIS\ Fault}$, and $CKCP_{Cam\ Cover\ Fault}$.

Next at 524, the method includes generating CKCP nominal and faulted models. These nominal and faulted models may be delivered to desired locations in the control system. In one example, the model may contain information to calculate a high specification nominal model, a low specification nominal model, Dp for the oil separator, and the crankcase pressure for the high/nominal/low specification models. Further, in one example, the model may use a file that asks for specifications and calibrations. To elaborate, the specifications may use 3D tables and maps related to blow-by flowrate as a function of engine speed and gauge map, a vehicle speed signal (VSPD) CKCP offset 3D table as a function of vehicle speed and BP, a blow-by flowrate time constant 2D table as a function of engine speed, engine speed CKCP offset 2D table as a function of engine speed, fresh air pressure 2D table as a function of airflow through the engine, PCV flowrate 2D table as a function of gauge MAP, and/or PCV flowrate time constant 2D table as a function of engine speed. However, additional or alternate specifications of the CKCP model have been contemplated.

An accurate estimation of the nominal and faulted system allows the system to monitor when a difference exists between the models, if desired. The system may also determine if the actuator sensor signal looks more like the nominal model or the faulted model. Further, in one example, a model may be used to allow the PCM data to be run through to refine and compare proposed diagnostics.

Turning now to FIG. 9, an example method 900 is shown for diagnosing a PCV system, such as the PCV system shown in FIGS. 2 and 3. Instructions for carrying out method 900 may be executed by a controller based on instructions stored on a memory of the controller and in conjunction with signals received from sensors of the engine system, such as the sensors described above with reference to FIGS. 2-3. The controller may employ actuators of the vehicle system to adjust vehicle operation, according to the methods described below. Method 900 may be implemented in the integral diagnostic module 410, shown in FIG. 4.

At 902, the method includes determining if the AIS is operational. If it is determined that the AIS is not operational (NO at 902) the method returns to 902. Conversely, if it is determined that the AIS is operational (YES at 902) the method moves to 904.

At 904, the method includes determining if an AIS test should be implemented. If it is determined that the AIS test should not occur (NO at 904) the method returns to 902. Conversely, if it is determined that the AIS should occur (YES at 904) the method moves to 906.

At 906, the method includes determining if the CKCP should be integrated. If it is determined that the CKCP should not be integrated (NO at 906) the method returns to 902. Conversely, if it is determined that the CKCP should be integrated (YES at 906) the method moves to 908.

At 908, the method includes calculating the CKCP nominal difference. At 910, the method includes calculating CKCP faulted difference.

At 912, the method includes calculating the CKCP model difference. This calculation may be carried out using equation (23).

$$CKCP_{Model\ diff}=|CKCP_{nominal\ final}-CKCP_{faulted\ final}| \quad (23)$$

At 914 the method includes determining if the CKCP model difference is greater than a threshold value. If the CKCP model difference is not greater than the threshold value (NO at 914) the method returns to 902. If the CKCP model difference is greater than the threshold value (YES at 914) the method proceeds to 916.

The system may accumulate data (when the respective integration flag is enabled and the value of the error is greater than a noise floor) by integrating the errors between the sensor signal to the nominal and faulted model and also integrating the difference between the faulted and nominal models.

At 916, the method includes calculating the CKCP nominal area. Equations (24) and (25) may be used to calculate the CKCP nominal area.

$$CKCP_{nominal\ diff}=CKCP_{nominal\ final}-\text{air CKCP measurement} \quad (24)$$

$$CKCP_{Nominal\ Area}=\int_0^T CKCP_{nominal\ diff}*dt \quad (25)$$

Figure 10:
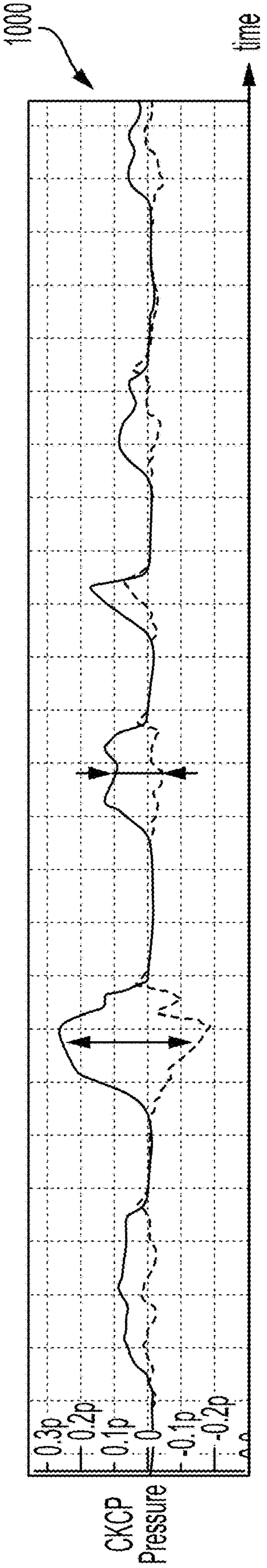
FIGS. 10-12 show different graphs related to the method depicted in FIG. 9.

Graph 1000, of the CKCP pressure vs time, shown in FIG. 10, graphically depicts the CKCP nominal model difference.

At 918, the method includes calculating the CKCP faulted area. Equations (26) and (27) may be used to calculate the CKCP faulted area.

$$CKCP_{faulted\ diff}=CKCP_{faulted\ final}-\text{air CKCP measurement} \quad (26)$$

$$CKCP_{faulted\ Area}=\int_0^T CKCP_{faulted\ diff}*dt \quad (27)$$

Figure 11:
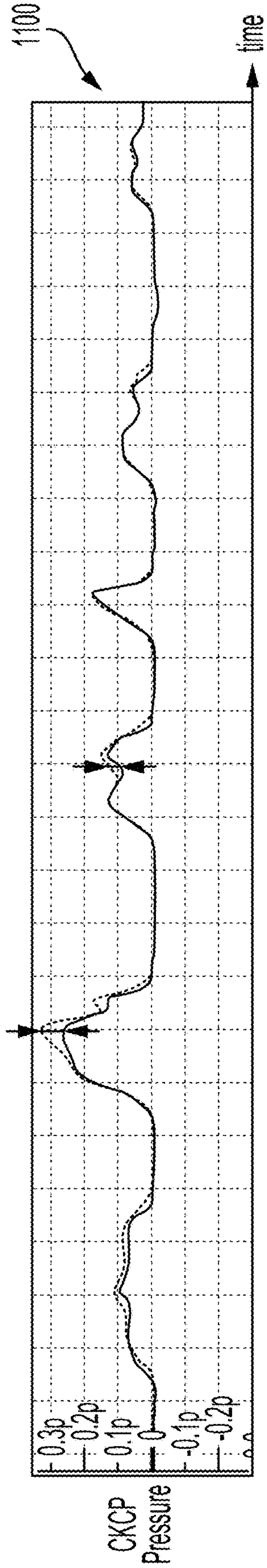

Graph 1100, of the CKCP pressure vs time, shown in FIG. 11, graphically depicts the CKCP faulted model difference.

At 920, the method includes calculating the CKCP model difference. Equations (28) and (29) may be used to calculate the CKCP model difference.

$$CKCP_{Model\ diff}=|CKCP_{nominal\ final}-CKCP_{faulted\ final}| \quad (28)$$

$$CKCP_{Total\ Area}=\int_0^T CKCP_{Model\ diff}*dt \quad (29)$$

Figure 12:
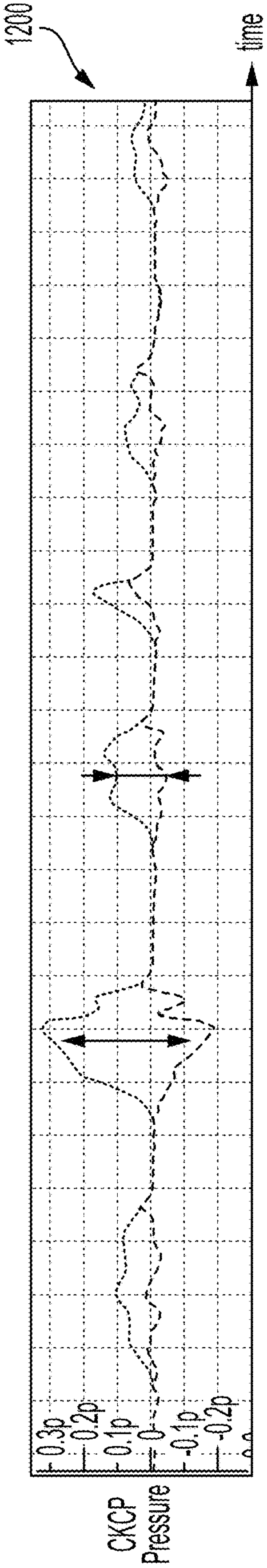

Graph 1200, of CKCP pressure vs time, shown in FIG. 12, graphically depicts the CKCP model difference.

At 922, the method includes determining if the CKCP total area has exceeded a threshold value. The threshold values described herein may be non-zero values. Equations (30) and (31) may be used to make such a determination.

$$CKCP_{Nominal\ Ratio} = \frac{CKCP_{Nominal\ Area}}{CKCP_{Total\ Area}} = \frac{\int_0^T CKCP_{nominal\ diff} * dt}{\int_0^T CKCP_{Model\ diff} * dt} = \frac{\int_0^T (CKCP_{nominal\ final} - \text{air\_ckcp\_meas}) * dt}{\int_0^T |CKCP_{nominal\ final} - CKCP_{faulted\ final}| * dt} \tag{30}$$

$$CKCP_{Faulted\ Ratio} = \frac{CKCP_{faulted\ Area}}{CKCP_{Total\ Area}} = \frac{\int_0^T CKCP_{faulted\ diff} * dt}{\int_0^T CKCP_{Model\ diff} * dt} = \frac{\int_0^T (CKCP_{faulted\ final} - \text{air\_ckcp\_meas}) * dt}{\int_0^T |CKCP_{nominal\ final} - CKCP_{faulted\ final}| * dt} \tag{31}$$

If it is determined that the CKCP total area has not exceeded a threshold value (NO at 922) the method moves to 902.

If it is determined that the CKCP total area has exceeded a threshold value (YES at 922) the method moves to 924. At 924 the method includes calculating the CKCP nominal ratio. At 926, the method includes calculating the CKCP faulted ratio and at 928, the method includes calculating the distance to nominal behavior.

At 930, the method includes determining if the distance to the nominal behavior is greater than a threshold value. If it is determined that the distance to the nominal behavior is greater than the threshold value (YES at 930). The method moves to 932, where the method includes generating a passed diagnostic. Conversely, if it is determined that the distance to the nominal behavior is not greater than the threshold value (NO at 930), the method moves to 934 where the method includes generating a faulted diagnostic.

A diagnostic technique may be used to detect if a removed CKCP sensor (reading the atmospheric pressure) as the integral diagnostic is unable to detect such a fault.

Calculating the slope (e.g., rate of change) of the nominal model and sensor to signal, the system may expect or see movement in the sensor so that a timer may be initiated. Another timer may be initiated when the sensor sees movement (via the slope calculation).

Turning now to FIG. 13, an example method 1300 is shown for diagnosing a PCV system, such as the PCV system shown in FIGS. 2 and 3. Instructions for carrying out method 1300 may be executed by a controller based on instructions stored on a memory of the controller and in conjunction with signals received from sensors of the engine system, such as the sensors described above with reference to FIGS. 2-3. The controller may employ actuators of the vehicle system to adjust vehicle operation, according to the method described below. Method 1300 may be implemented in the sensor movement diagnostic module, shown in FIG. 4. It will be appreciated that method 1300 may be implemented when the difference between the faulted model and the nominal model exceeds a threshold value. To elaborate, method 1300 may be implemented in response to execution of step 934 shown in FIG. 9.

As shown in FIG. 13, at 1302, the method includes calculating a 2-point and a 5-point slope from the sensor and nominal model signal. The 2-point slope may be calculated using equation (32).

$$\text{Slope} = \frac{\text{New Value} - \text{Old Value}}{\Delta t} \tag{32}$$

The 5-point slope may be calculated using a least squares regression algorithm to calculate the slope using the last 5 points in the signal, in one example. For instance, equation (33) may be used to determine the 5-point slope.

$$\text{Slope} = \frac{N * \sum(x * y) - \sum x * \sum y}{N * \sum x^2 - (\sum x)^2} \tag{33}$$

In equation (33) N is the number of points used for the least squares regression, in this use-case case 5, x is the time at which each sample of the signal was sampled, and y is the sampled signal.

At 1304, the method includes determining if the air intake system is operational. If it is determined that the air intake system is not operational (NO at 1304), the method returns to 1302. Conversely, if it is determined that the air intake system is operational (YES at 1304) the method moves to 1306.

At 1306, the method includes determining if an air intake system slope test should be implemented. For instance, the slope test may be implemented if the AIS airflow is within a desired range, the engine speed is within a desired range, the gauge MAP is within a desired range, and/or if the slope is above a threshold value.

If it is determined that the intake system slope test should not be implemented (NO at 1306) the method returns to 1302. Conversely, if it is determined that the intake system slope test should be implemented (YES at 1306) the method moves to 1308. At 1308, the method includes incrementing an actual and an expected CKCP sensor timer. Next at 1310, the method includes calculating a CKCP stuck ratio (actual/expected). The CKCP stuck ratio represents the amount of time the system saw movement in the CKCP sensor when it was expecting movement.

At 1312, the method includes determining if the CKCP stuck ratio is above a threshold value. If the CKCP stuck ratio is above the threshold value (YES at 1312) the method moves to 1314 where the method includes generating a passed diagnosis. Conversely, if the CKCP stuck ratio is not above the threshold value (NO at 1312) the method moves to 1316 where the method includes generating a fault diagnosis. Generation of the fault diagnosis may trigger a fault indicator. In this way, the PCV system can be more confidently diagnosed.

In one aspect, a method is provided that comprises at a controller, generating an estimated crankcase pressure at the location of a crankcase pressure sensor based on a nominal model and a faulted model of a positive crankcase ventilation (PCV) system that is generated by the controller; and diagnosing a PCV system component based on a difference between the estimated crankcase pressure and an input from the crankcase pressure sensor; and responsive to the crankcase pressure sensor having a degraded diagnosis, triggering a sensor degradation indicator. In the method, the PCV system may be modeled based on one or more pressure balanced equations, in one example. In the method, diagnosing the PCV system component may include comparing the faulted model of the PCV system with the nominal model of the PCV system, in one example. The method may further comprise, in one example, initiating monitoring of the crankcase pressure sensor when a difference between the faulted model and the nominal model surpasses a threshold value. In the method, in one example, the difference between the faulted model and the nominal model may be determined based on integration of the faulted model and the nominal model. In the method, in one example, the estimated crankcase pressure may be generated based on engine speed, manifold air pressure, manifold airflow, barometric pressure, and vehicle speed. In the method, in one example, the nominal model and the faulted model may utilize one or more quadratic equations. In the method, in one example, the PCV system component may be the crankcase pressure sensor. In the method, in one example, the PCV system component may be an air intake assembly or a cam cover.

In another aspect, a vehicle system is provided that comprises a crankcase pressure sensor; and a controller with computer-readable instructions stored on memory that when executed, during a first condition, cause the controller to: generate estimated crankcase pressures at the location of the crankcase pressure sensor based on a nominal model and a faulted model of a positive crankcase ventilation (PCV) system that is generated by the controller; and diagnose a PCV system component based on one or more comparisons between the estimated crankcase pressures and/or a signal from the crankcase pressure sensor; responsive to the crankcase pressure sensor having a degraded diagnosis, generate a sensor degradation indicator. In one example, diagnosing the crankcase pressure sensor may include determining a difference between the signal from the crankcase pressure sensor and the nominal model when a difference between the degraded PCV system model and the nominal PCV system model exceeds a threshold value. In one example, in the vehicle system, the crankcase pressure sensor may be diagnosed for a first drive cycle and the controller may further include computer-readable instructions stored on memory that when executed cause the controller to: carry over the crankcase pressure sensor diagnostic to a second drive cycle. In one example, in the vehicle system, the nominal PCV system model may be generated based on a ram air effect offset. In one example, in the vehicle system, the PCV system component may be the crankcase pressure sensor, an air intake assembly, or a cam cover. In one example, in the vehicle system, the PCV system is a naturally aspirated PCV system. In one example, in the vehicle system, the PCV system may be a boosted PCV system.

In yet another aspect, a method for operating a positive crankcase ventilation (PCV) system is provided that comprises generating a nominal model of a positive crankcase ventilation (PCV) system; determining an estimated crankcase pressure at the location of the crankcase pressure sensor based on the nominal model; diagnosing the crankcase pressure sensor based a comparison a signal from the crankcase pressure sensor and the estimated crankcase pressure; and responsive to the crankcase pressure sensor having a degraded diagnosis, triggering a sensor degradation indicator. In one example, the method may further comprise generating a faulted model of the PCV system; comparing the faulted model to the nominal model; in response to the faulted model and the nominal model diverging beyond a threshold value, determining an accumulated different between the nominal model and the signal from the crankcase pressure sensor; and diagnosing the crankcase pressure sensor having a degraded diagnosis based on the accumulated difference. Further, in one example, comparing the faulted model to the nominal model includes integrating the faulted model and the nominal model. Further, in one example, the PCV system may be included in a boosted engine.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:

at a controller, executing a nominal crankcase pressure model corresponding to a crankcase location to determine a nominal crankcase pressure of a positive crankcase ventilation (PCV) system;

executing a faulted crankcase pressure model corresponding to the crankcase location to determine a faulted crankcase pressure of the PCV system;

determining a difference between the nominal crankcase pressure and the faulted crankcase pressure;

diagnosing a PCV system component based on the difference between the nominal crankcase pressure and the faulted crankcase pressure; and responsive to the crankcase pressure sensor having a faulted diagnosis, triggering a sensor degradation indicator;

where the crankcase location is positioned within the crankcase.

2. The method of claim 1, where the nominal crankcase pressure model includes one or more pressure balanced equations.

3. The method of claim 1, where diagnosing the PCV system component includes comparing the faulted model of the PCV system with the nominal model of the PCV system.

4. The method of claim 3, further comprising initiating monitoring of the crankcase pressure sensor when a difference between the faulted model and the nominal model surpasses a threshold value.

5. The method of claim 3, where the difference between the faulted model and the nominal model is determined based on integration of the faulted model and the nominal model.

6. The method of claim 1, where the estimated crankcase pressure is generated based on engine speed, manifold air pressure, manifold airflow, barometric pressure, and vehicle speed.

7. The method of claim 1, where the nominal model and the faulted model utilize one or more quadratic equations.

8. The method of claim 1, where the PCV system component is the crankcase pressure sensor.

9. The method of claim 1, where the PCV system component is a PCV conduit.

10. A vehicle system comprising:

a crankcase pressure sensor; and a controller with computer-readable instructions stored on memory that when executed, during a first condition, cause the controller to:

execute a nominal crankcase pressure model corresponding to a crankcase location to determine a nominal crankcase pressure of a positive crankcase ventilation (PCV) system;

execute faulted crankcase pressure model corresponding to the crankcase location to determine a faulted crankcase pressure of the PCV system;

determine a difference between the nominal crankcase pressure and the faulted crankcase pressure;

diagnose a PCV system component based on the difference between the nominal crankcase pressure and the faulted crankcase pressure; and responsive to the crankcase pressure sensor having a degraded diagnosis, generate a sensor degradation indicator.

11. The vehicle system of claim 10, where the crankcase location is positioned within the crankcase.

12. The vehicle system of claim 11, where the crankcase pressure sensor is diagnosed for a first drive cycle and where the controller further includes computer-readable instructions stored on memory that when executed cause the controller to:

carry over the crankcase pressure sensor diagnostic to a second drive cycle.

13. The vehicle system of claim 10, where the nominal crankcase pressure model is generated based on a ram air effect offset.

14. The vehicle system of claim 10, where the PCV system component is the crankcase pressure sensor or a PCV conduit.

15. The vehicle system of claim 10, where the PCV system is a naturally aspirated PCV system.

16. The vehicle system of claim 10, where the PCV system is a boosted PCV system.

17. A method for operating a positive crankcase ventilation (PCV) system, comprising:

executing a nominal crankcase pressure model corresponding to a crankcase location to determine a nominal crankcase pressure of the PCV system;

executing a faulted crankcase pressure model corresponding to the crankcase location to determine a faulted crankcase pressure of the PCV system;

determining a difference between the nominal crankcase pressure and the faulted crankcase pressure;

diagnosing the crankcase pressure sensor based on the difference between the nominal crankcase pressure and the faulted crankcase pressure; and responsive to the crankcase pressure sensor having a degraded diagnosis, triggering a sensor degradation indicator.

18. The method of claim 17, where determining the difference between the nominal crankcase pressure and the faulted crankcase pressure includes determining an accumulated difference between the nominal crankcase pressure model and the signal from the crankcase pressure sensor; and diagnosing the crankcase pressure sensor having the degraded diagnosis based on the accumulated difference.

19. The method of claim 18, where determining the difference between the nominal crankcase pressure and the faulted crankcase pressure includes integrating the faulted model and the nominal model.

20. The method of claim 17, where the PCV system is included in a boosted engine.

* * * * *